No. 682,302. Patented Sept. 10, 1901.
A. E. WHEATCROFT.
HOOF SHIELD.
(Application filed June 21, 1901.)
(No Model.)
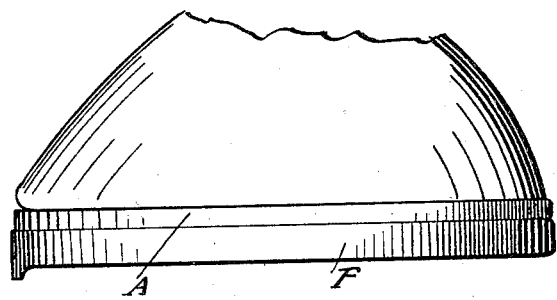
*Fig. 1*
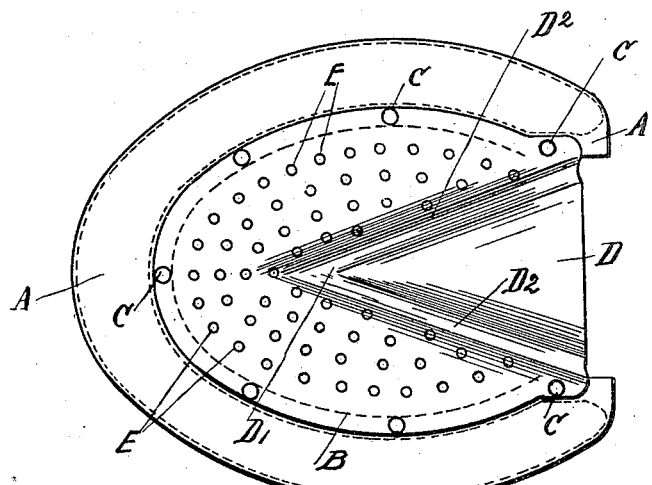
*Fig. 2*
*Fig. 3*
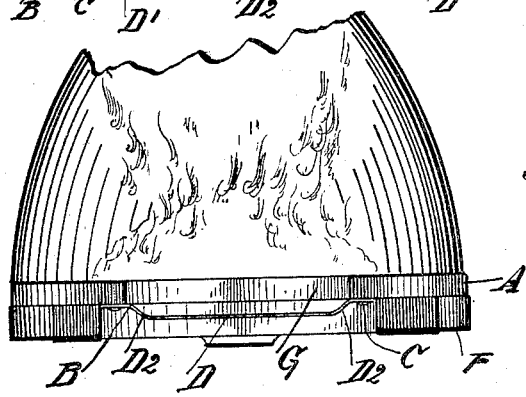
*Fig. 4*
WITNESSES
F. W. Stewart.
F. F. Seller
INVENTOR
Albert E. Wheatcroft.
BY
Edgar Yates
ATTORNEYS
THE NORRIS PETERS CO., PHOTO-LITHO., WASHINGTON, D. C.

UNITED STATES PATENT OFFICE.

ALBERT E. WHEATCROFT, OF NEW YORK, N. Y.

HOOF-SHIELD.

SPECIFICATION forming part of Letters Patent No. 682,302, dated September 10, 1901.

Application filed June 21, 1901. Serial No. 65,400. (No model.)

*To all whom it may concern:*

Be it known that I, ALBERT E. WHEATCROFT, a citizen of the United States, residing at New York, in the county of New York and State of New York, have invented certain new and useful Improvements in Hoof-Shields, of which the following is a full and complete specification, such as will enable those skilled in the art to which it appertains to make and use the same.

The object of my invention is to provide a device which will shield or guard the frog and coffin-joint of a horse's hoof against contact with and injury from stones, nails, and other objects generally struck by horses' hoofs at the present time without danger of the shock of contact of the shield and the rough object reaching or affecting the frog or coffin-joint and without the hitherto-attendant disadvantage and serious detriment of clogging the horse's hoof or leaving it subject to the accumulation of dirt or morbid matter excreted by the hoof itself.

It is further and more particularly the object of my invention to provide a simple, cheap, readily-constructed, and perfectly-operating device which may be applied to a horse's hoof by the blacksmith when shoeing the horse, and which without skill or expert knowledge on his part will so fit the hoof relatively to the frog and coffin-joint as to be held positively and invariably out of contact with these portions of the foot and leave the same free for the circulation of air and water for the stuffing and unstuffing of the hoof at night or during exercising, road, or cartage work, and which will receive and itself withstand the shock of striking stones, nails, or other objects, and which when yielding at all under such impact will do so in such manner as to distribute the pressure and strain and also prevent its reaching the frog or coffin-joint.

With these and other objects in view my invention consists, primarily, of a horseshoe-shaped leather backing centrally open and adapted to bear against the wall of the hoof around the outer edge of the under surface of the said hoof, between the hoof and the horseshoe and inwardly of the latter, and a rigid, stiff, and unyielding plate of metal secured upon the inner projecting edge of the leather backing upon the under surface thereof and adapted to range across the hoof within the inner margin or edge of the horseshoe to shield the frog and form, with the leather backing, a cavity beneath the same, so that when the metal plate is struck by a stone it will not itself yield under the impact thereof, but will as a whole move slightly upwardly along the hinge formed by the point or line of connection of the plate with the leather backing, and, secondarily, my invention consists of such a horseshoe-shaped leather backing so provided with an individually-rigid metallic plate secured upon its under and inner edges, as stated, and further formed with its forward portion perforated throughout and provided centrally and at the rear with a downwardly-projecting V-shaped or triangular extension or depression lying on a plane wholly below the leather backing to be out of contact with the frog and coffin-joint of the hoof and to leave a considerable cavity beneath the same, the depressed portion being imperforate to make it still stronger and unyielding and having its apex directed toward a point at the center, whereby the diagonal edges of this portion of the plate will direct stones or other matter away therefrom and keep them out of contact with either the frog or its projecting portion of the shield.

In the accompanying drawings, forming part of this specification, in which like letters of reference designate corresponding parts in the several views, Figure 1 is a side elevation of the lower portion of a hoof provided with a shoe and with my improved hoof-shield. Fig. 2 is an inverted plan view of the shield removed. Fig. 3 is a side elevation or edge view of the same, and Fig. 4 is a rear elevation of the device as shown in Fig. 1.

In the practice of my invention I construct a horseshoe-shaped leather backing A of a size to fit an ordinary horseshoe of the general form or size for which the shield is intended and open throughout its central portion. It should be made to fit the largest shoe of the particular type or class, (as for a trotting horse, a coach-horse, or a cart-horse, all of which have considerably-varying sizes of hoofs.) The excess of the leather may be cut off after the horseshoe and the hoof-shield are fitted to the hoof. I also make the leather of a sufficient width to project inwardly beyond the inner edge of the horseshoe. I have indicated the shoe in dotted lines in Fig. 2, though as this is an inverted plan view it shows the under side or that which contacts with the horseshoe, and I have also indicated in dotted lines the inner edge of the backing. Upon the under surface of the leather backing A, I secure a plate B, very much smaller than the leather backing and slightly larger than the space within the center of the said backing, so that the outer edge of the plate projects over that portion of the inner edge of the leather backing which in practice projects inwardly of the horseshoe. Around its periphery the plate B is secured to the said inner edge of the leather backing A by means of a plurality of rivets C, placed at suitable distances apart. The plate completely covers the central opening of the backing A. Centrally and at the rear of the plate B it is in the process of manufacture struck down or depressed either by hot or cold forging or by casting the same to form a substantially V-shaped or triangular depressed portion D, which at the rear of the plate is offset therefrom at a point close to the rivets C and lies appreciably beneath but parallel with the plane of the leather backing A. The depressed portion D gradually narrows or tapers inwardly to about a point D' at or slightly forward of the center of the plate, so that the said depressed portion is formed with diagonal sides $D^2$. This portion D is, as will be seen in Fig. 3, parallel with the plane of the leather backing throughout its length, and by reason of its form the sides $D^2$ will be inclined or beveled downwardly as well as tapered or diagonal longitudinally, and except for their depressions the rest of the plate is wholly flat. Throughout the remaining portion of the plate B, I form therein a plurality of perforations E of such size or diameter as to but partially permit the entrance of an ordinary horseshoe-nail; but it will be understood that the object of these perforations is to permit the circulation of air or water through the shield, and it is for the purpose of preventing any nails which might enter such perforations from injuring the hoof that I make them so small as to catch the nail before it has projected far enough to do any damage, and since the whole of the plate B lies upon a plane beneath the horseshoe-shaped leather backing A and beneath the upper level of the horseshoe this shield effectually operates to keep such nails from reaching the hoof. It is not necessary that the entire main portion of the plate be perforated, and the depressed portion I leave imperforate, so as to make it relatively even more stiff, strong, and rigid than the rest of the plate, as this depressed portion is designed to project or protrude below the level of the leather backing and the top of the horseshoe to receive all the strains of contact with rough or loose objects on the road.

The operation of the device will be readily understood from the foregoing description, taken in connection with the accompanying drawings, and the advantages resultant from the use thereof will be manifest to all who are conversant with devices of this character.

The shield is placed upon the horse's hoof beneath the shoe when the latter is being applied or replaced. As best shown in Fig. 4, the leather backing is laid with its upper face in contact with the hoof and the depressed portion D projecting downwardly and out of contact with the hoof, and the horseshoe F is placed upon the under surface of the said backing immediately outside of the metallic plate B. The same nails which secure the horseshoe secure the shield, and it is not necessary to form a shield especially for each hoof of every horse, as would be the case if my hoof-shield were secured through its central or metallic portion B. When the shoe is properly in place, the metallic plate B will lie within the central space of the said shoe, and as the leather backing forms a hinge for the said plate the latter will be capable of vertical movement, limited or retarded by the resistance of the leather. By impact against the under face of the shield it will rise slightly, the projecting inner edge of the leather backing bending upwardly, or if pressure is applied to the upper face of the shield it will in virtue of the said hinge-mounting move slightly downward, the projecting portion of the leather bending over the inner edge of the shoe. The leather backing A and the plate B form beneath the horse's hoof a cavity or recess G, which at the rear or depressed portion of the plate is of relatively considerable depth. This leaves the frog of the hoof entirely free from contact with the metallic plate or any other part or element of the shield or from pressure of any kind against the same and open for the circulation of air, and it also permits the expansion of the frog and its easy movement during the working of the leg. It is not the object of my invention in any way to support the frog of the hoof; but, on the contrary, it is my purpose to leave the frog free from artificial braces of any kind. By leaving this cavity or recess G entirely open during the day, or while the horse is working, it will be seen, by reference to Figs. 3 and 4 of the drawings, that the construction and arrangement of my hoof-shield are such that all morbid matter which is excreted from the hoof will fall into the cavity G and will be directed toward the natural outlet thereof at the rear of the shield. Further, to remove this morbid matter and also to remove any dirt which may accumulate during the day the open portion at the rear of the hoof-shield and above the depressed portion D of the metallic plate B permits the insertion of a hose-nozzle at the rear of the hoof, and the rapid injection of water under pressure will remove this morbid matter. The circulation of air and the entrance of water to the hoof are especially facilitated during service by means of the perforations E, which I form in the main portion of the metallic plate B. These perforations also coöperate in enabling the removal of foreign matter and cleansing of the hoof, the water which is injected at the rear escaping through the perforations in the forward portion of the plate. I may also at night, or even during actual service, stuff the hoof with tar and oakum, which may, if desired, be inserted and removed each day or at frequent intervals through the medium of the cavity or recess G, and by reason of the hinge-mounting of the plate B the rear portion of the same may be stuffed quite full, this hinge-mounting permitting the depressed portion D of the plate to descend still farther. As the horse's hoof moves forwardly, stones or other loose objects on the road which may be struck by the hoof will be directed outwardly by the diagonal or tapered sides $D^2$ of the portion D and will be deflected away from the frog. When the hoof comes straight down upon such objects, the shield will receive the impact thereof and distribute the strain and will prevent the shock from reaching the protected portions of the hoof, and when the object is immediately below the frog and coffin-joint of the hoof it will strike the most rigid and strong-depressed portion D, and however great the pressure of the stone against the said depressed portion (within the limits of the weight of the horse, which determines the pressure) the portion D will not come in contact with the frog or coffin-joint in consequence of its normal projection and of its rigidity and of the size of the cavity G and of the downward spring which will be given the plate B when it is forced upward against the action of the leather backing A, the major portion whereof is clamped between the hoof and the horseshoe. Hence it will be seen that the frog and coffin-joint do not receive, directly or indirectly, any blow or pressure from any loose objects struck by the hoof and that they are always out of contact with any element or part of the shield.

Having thus fully described my invention, what I claim as new, and desire to secure by Letters Patent, is—

1. A hoof-shield comprising a horseshoe-shaped leather backing and a rigid metallic plate of lesser size having its outer edge secured immediately upon the inner edge of the leather backing upon the under surface thereof and lying wholly beneath the plane of the said backing, out of contact with the hoof, whereby a cavity or recess is formed between said plate and the hoof.

2. A hoof-shield comprising a horseshoe-shaped leather backing and a metallic plate of lesser size having its outer edge secured immediately upon the inner edge of the leather backing upon the under surface thereof and lying wholly beneath the plane of the said backing, out of contact with the hoof, whereby a cavity or recess is formed between said plate and hoof, a portion of the said plate being depressed centrally and at the rear thereof to form a downwardly-projecting part, open at the rear of the hoof.

3. A hoof-shield comprising a horseshoe-shaped leather backing and a metallic plate of lesser size having its outer edge secured immediately upon the inner edge of the leather backing, upon the under surface thereof, and lying wholly beneath the plane of the said backing, out of contact with the hoof, whereby a cavity or recess is formed between said plate and the hoof, the said plate being formed with a triangular depressed portion centrally and at the rear thereof, the apex of which is directed forwardly of the hoof, and which is open at the rear.

4. A hoof-shield comprising a backing of a form, size and material to rest between the hoof and the horseshoe and to permit the passage of the horseshoe-nails therethrough at any point, and a rigid metallic plate of considerably lesser size having its outer edge secured upon the inner edge of the backing, whereby the latter when clamped between the hoof and shoe will form a hinge-mounting therefor.

5. A hoof-shield comprising a horseshoe-shaped backing of the character described, and a metallic plate secured upon the inner edge of the said backing and lying wholly beneath the plane thereof, and out of contact with the hoof, whereby a cavity or recess is formed between the said plate and the hoof, the said cavity or recess being open at the rear, and a portion of the plate being perforated forwardly of the said rear opening of the cavity, whereby water may be injected at the rear of the shield and ejected forwardly thereof.

6. A hoof-shield comprising a horseshoe-shaped backing of the character described, a rigid metallic plate having its outer edge secured to the inner edge of the said backing and projecting beneath the plane of the backing to form a cavity or recess between the plate and the hoof, a triangular depressed portion formed in said plate at the rear thereof, and having its apex directed forwardly near the center of the plate, and ranging along the plane parallel with the plane of the backing; the forward portion of the plate being perforated and said depressed portion being imperforate.

7. A hoof-shield comprising a horseshoe-shaped centrally-open leather backing, a metallic plate having its outer edge secured to the inner edge of the said backing whereby it will be pivotally mounted relatively to the hoof when the shoe and shield are connected thereto, and a triangular depressed portion formed at the rear of the plate, extending across the central opening of the back and decreasing in diameter forwardly to form diagonal or inclined sides, the said depressed portion ranging beneath and on a plane parallel with the plane of the backing and forming with the remainder of the plate and said backing a cavity or recess between the said plate and the hoof.

8. A hoof-shield comprising a horseshoe-shaped leather backing adapted to rest between the hoof and the shoe and to be secured by the nails which secure the shoe to the hoof, and being of a form and size to project inwardly of the shoe, and being cut out or open at the center, a metallic plate of considerably lesser size having its outer edge secured to the inner edge of the leather backing upon the under surface thereof, the main portion of the plate being flat and the entire plate lying wholly beneath the plane of said backing out of contact with the hoof, whereby a cavity or recess is formed between the said plate and the hoof, the rear portion of the plate being formed with a downwardly-projecting triangular portion lying upon a plane parallel with the plane of the backing and extending at the rear wholly across the inside of the backing and leaving an enlarged cavity open at the rear of the shield and having its apex directed forwardly of the hoof and its sides inclined longitudinally and beveled downwardly, the main body or flat portion of the plate being formed with a plurality of perforations of such diameter as to prevent any nails which enter the rigid plate therethrough from projecting to or reaching the hoof, and the depressed portion of the plate being imperforate.

In testimony that I claim the foregoing as my invention I have signed my name, in presence of the subscribing witnesses, this 20th day of June, 1901.

ALBERT E. WHEATCROFT.

Witnesses:
PHILIP H. FETT,
ROY F. WITHERS.